Inventor
Ernest W. Seaholm

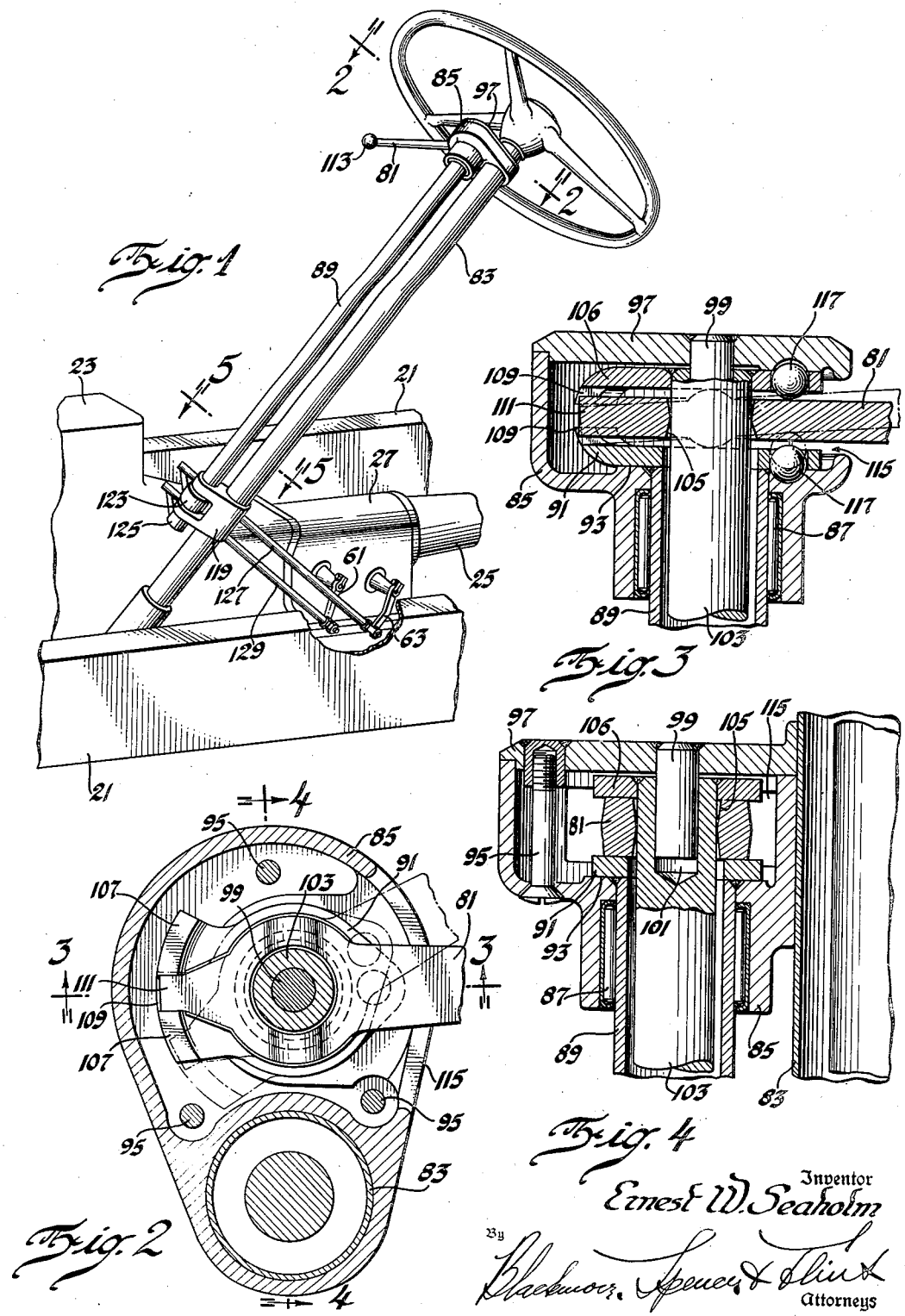

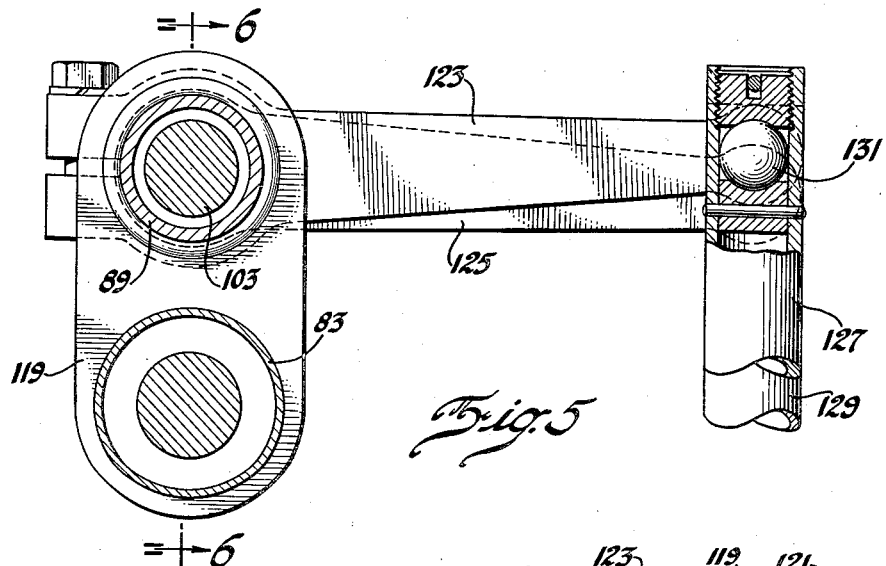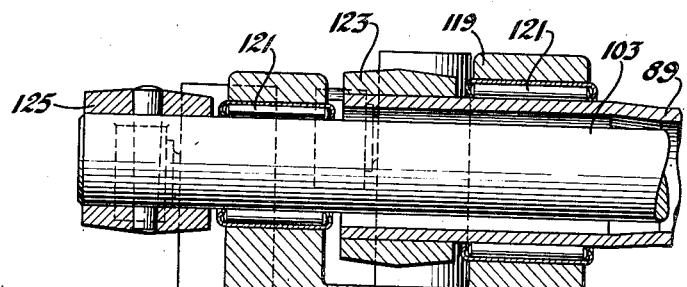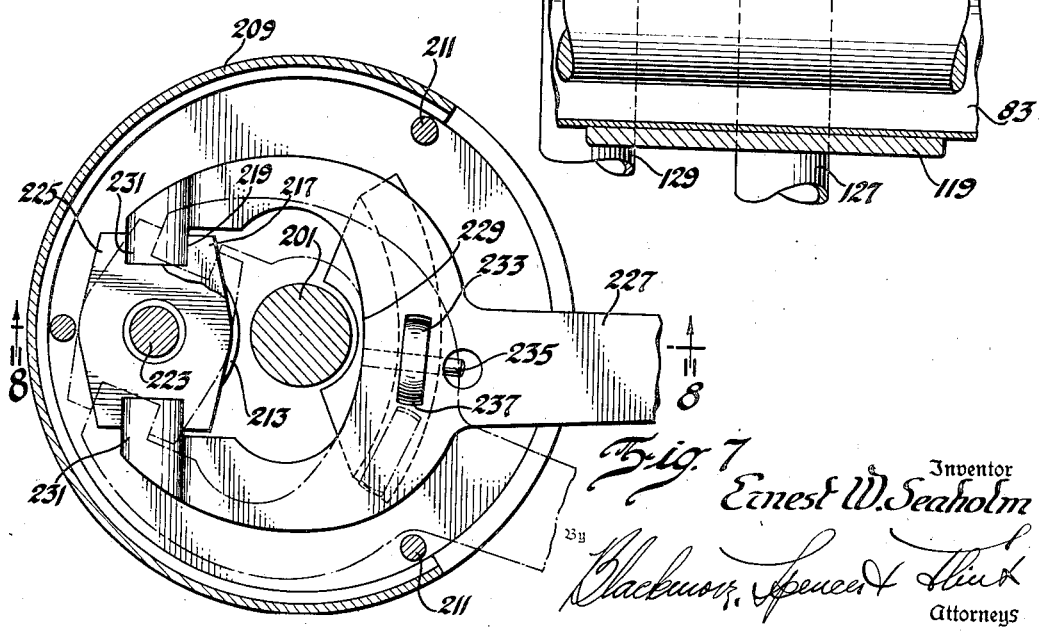

Sept. 5, 1939.  E. W. SEAHOLM  2,171,953
TRANSMISSION CONTROL
Filed Jan. 29, 1938  6 Sheets-Sheet 5

Inventor
Ernest W. Seaholm
By Blackmore, Spencer & Flint
Attorneys

Patented Sept. 5, 1939

2,171,953

UNITED STATES PATENT OFFICE 2,171,953

TRANSMISSION CONTROL

Ernest W. Seaholm, Birmingham, Mich., assignor to General Motors Corporation, Detroit, Mich., a corporation of Delaware Application January 29, 1938, Serial No. 187,604

10 Claims. (Cl. 74—485)

This invention relates to means for changing the driving ratio of a change speed mechanism such as is used on a motor vehicle between the engine and the propeller shaft.

An object of the invention is to provide what may be called remote control shifting means, this expression being intended to define means not extended directly into the housing of the change speed mechanism but otherwise located and connected to the movable elements of the change speed mechanism by intermediate parts.

A further object is to mount a manually operable lever adjacent the steering wheel and preferably on the fixed tubular steering column whereby the lever is readily accessible and whereby the operator's compartment is unobstructed by the now more commonly used shift lever extending down through the floor of the car into the transmission housing.

A still further object resides in the accomplishment of the major objects by a construction wherein the manipulation of the manually operable lever is not materially different from that of the more conventional shift lever.

As another object the invention makes use of simple rugged and inexpensive intermediate parts.

Still further the invention is used with operating parts within the gear housing which are considerably simpler than the conventional parts between the gearing and the shift lever.

Other objects and advantages will be understood from the following description.

The invention described below is illustrated upon the accompanying drawings.

In the drawings:

Figure 1 is a perspective of the ratio changing control means associated with the transmission housing and with the steering column.

Figure 2 is a sectional view substantially as seen from line 2—2 of Figure 1.

Figure 8:
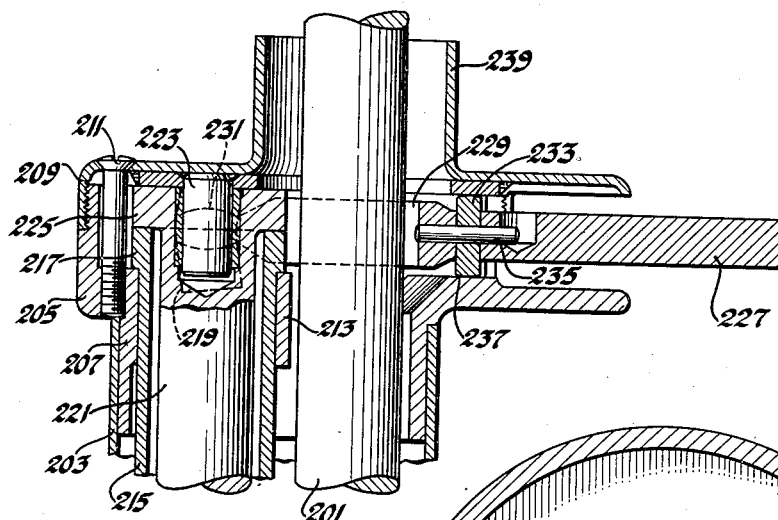
Figure 9:
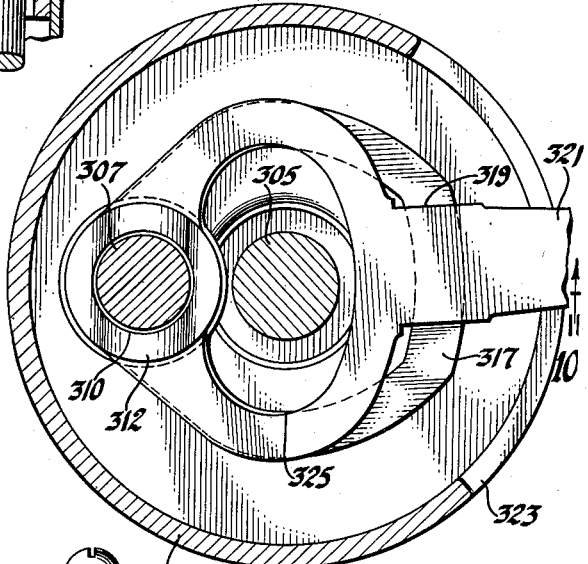
Figure 10:
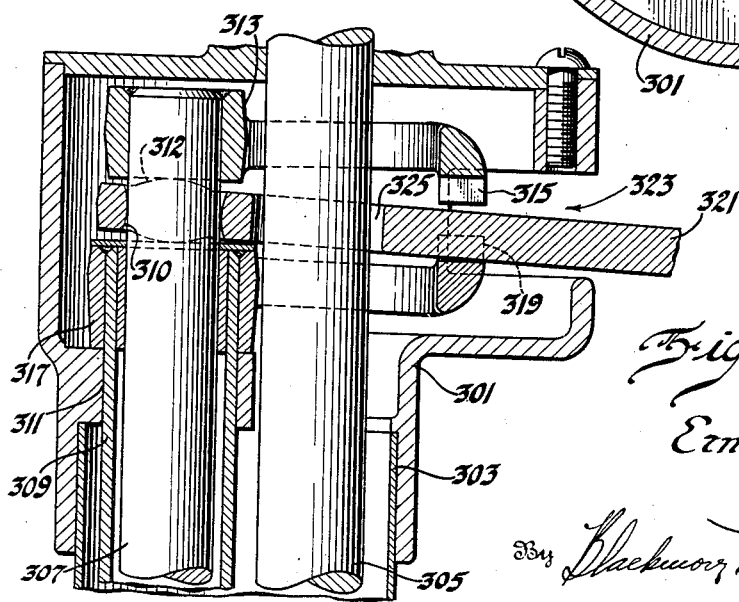
Figure 11:
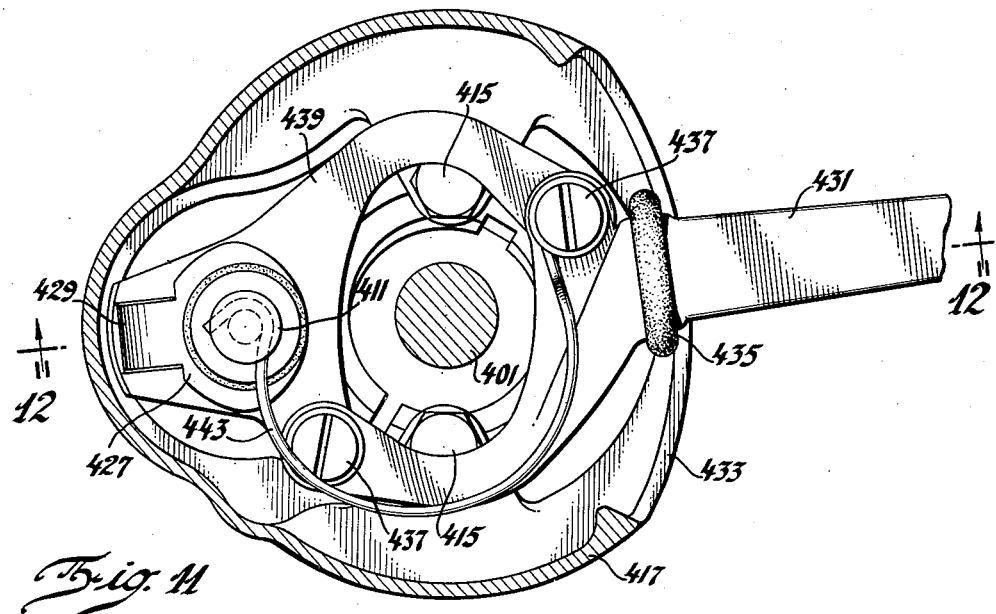
Figure 12:
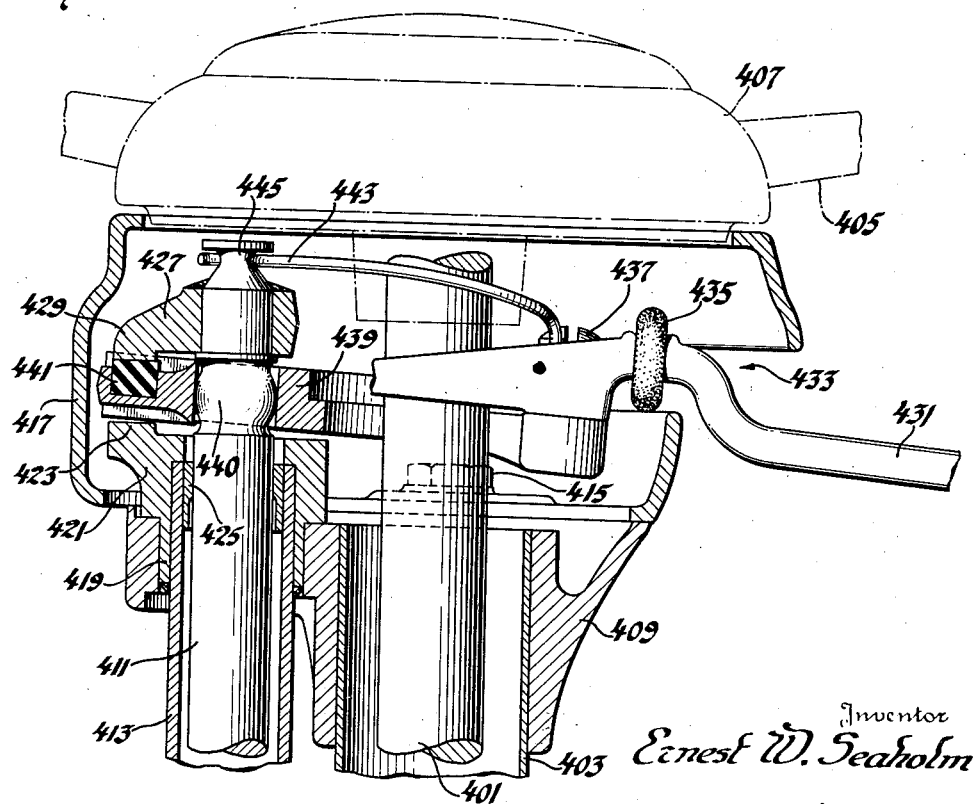

Figure 3 is a section on line 3—3 of Figure 2.
Figure 4 is a section on line 4—4 of Figure 2.
Figure 5 is a section on line 5—5 of Figure 1.
Figure 6 is a section on line 6—6 of Figure 5.
Figure 7 is a transverse section corresponding to that of Figure 2 but showing a modified form.
Figure 8 is a section on line 8—8 of Figure 7.
Figure 9 also corresponds to Figure 2 which shows another modification.
Figure 10 is a section on line 10—10 of Figure 9.
Figure 11 is a section also corresponding to Figure 2 but showing still another embodiment.
Figure 12 is a section on line 12—12 of Figure 11.

Figure 13:
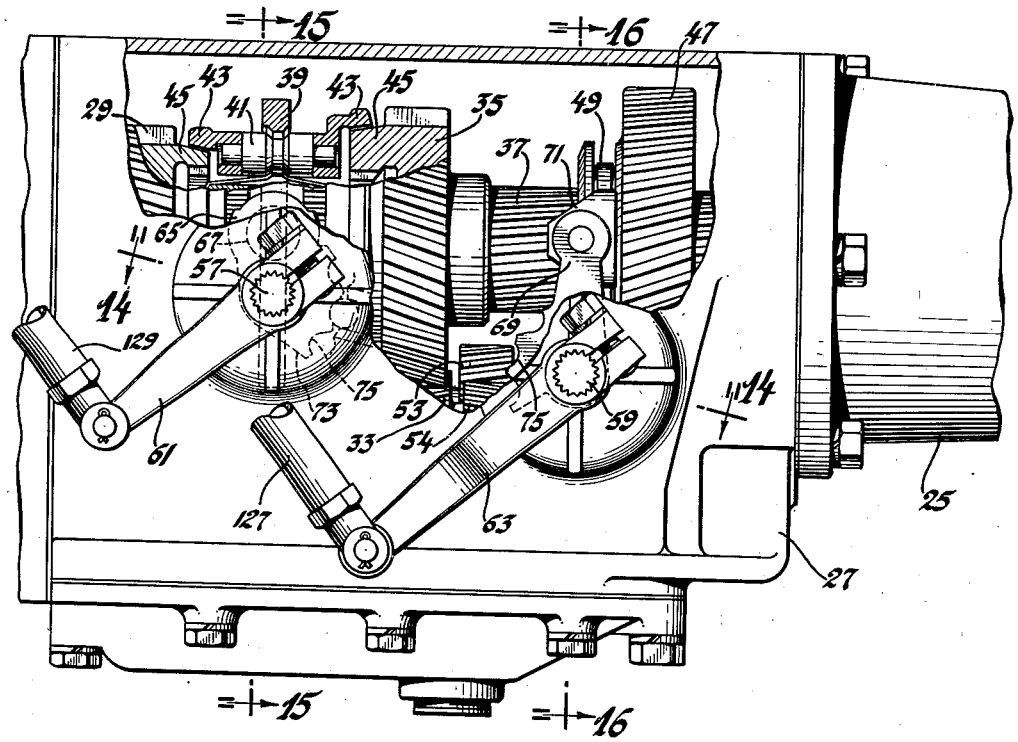

Figure 13 is a view in elevation of the change speed mechanism which wall being broken away to show the enclosed gearing.

Figure 14:
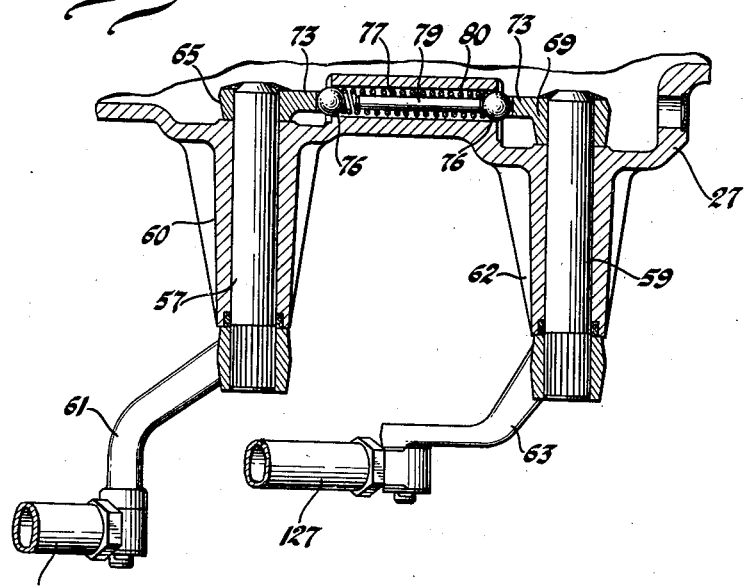

Figure 14 is a section on line 14—14 of Figure 13.

Figure 15:
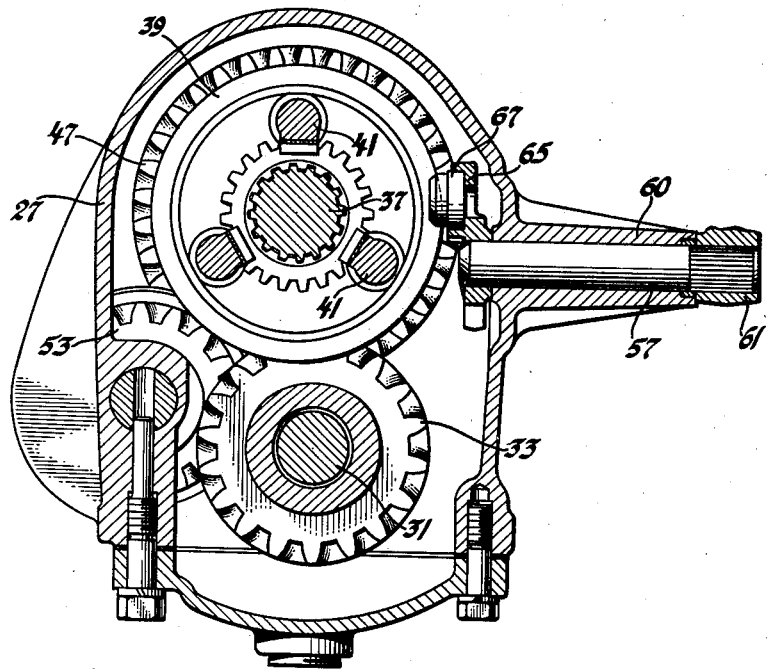

Figure 15 is a section on line 15—15 of Figure 13.

Figure 16:
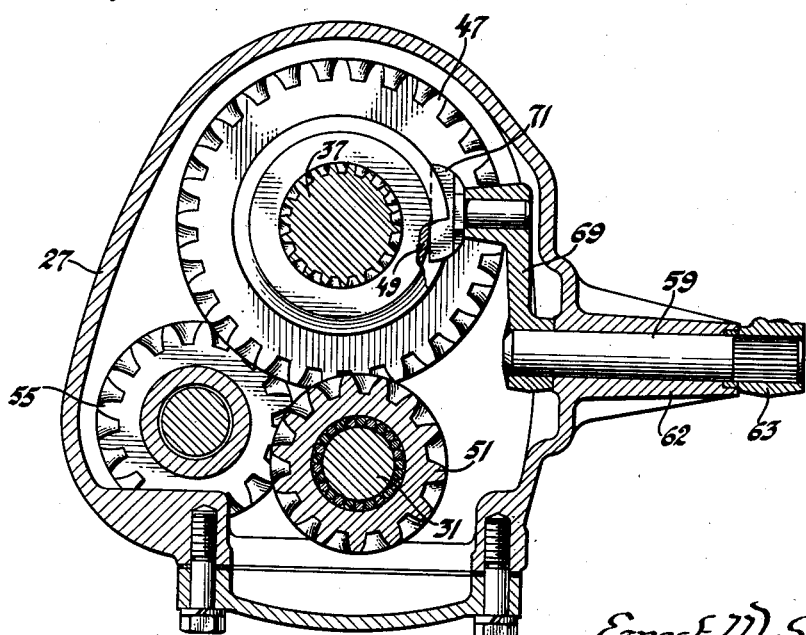

Figure 16 is a section on line 16—16 of Figure 13.

Referring to the drawings, numeral 21 represents the frame members of a motor vehicle, the engine being marked 23 and the propeller shaft, not shown, being carried within a housing 25. The change speed housing is marked 27.

The change speed mechanism is sufficiently illustrated by Figures 13 to 16 in order to show the relation of its moving parts to the adjacent parts of the operating linkage. The shaft driven by the engine through the instrumentality of the usual clutch, not shown, enters housing 27 where it is provided with a driving gear 29. A countershaft 31 is driven by the input shaft, it being provided with a gear, not shown in the drawings, in constant mesh with gear 29. Secured to the countershaft is a gear 33 in constant mesh with a gear 35 mounted for free rotation on driven shaft 37. A member 39 is slidably, but non-rotatably mounted on the driven shaft between gears 29 and 35. By means of a plurality of pins 41 its reciprocation first reciprocates friction clutches 43 into engagement with corresponding friction surfaces 45 associated with gears 29 or 35, depending upon its direction of movement. After effecting synchronization, a suitable detent device between the member 39 and the pins 41 is overcome and further reciprocation of 39 effects an engagement between teeth carried by the sliding member 39 and by the adjacent faces of gears 29 and 35. By this sliding movement the driven shaft may be directly clutched to the input shaft or it may be driven by the input shaft through gear train 33, 35, depending upon the direction of shifting of the member 39. To the rear of gear 35, helical splines on shaft 37 carry a reciprocable helical gear 47, this gear having a collar 49. This gear is adapted to be moved axially to mesh with the gear 51 on the countershaft for driving in low speed. For reverse driving there is provided a two-part idler gear having one gear element 53 driven by a countershaft gear 54 and a second gear element 55 with which gear 47 may be moved into engagement. Inasmuch as the above described gear assembly is substantially conventional, no further reference to it is believed necessary. The various ratios are attained by fore and aft shifting of members 39 and 47.

In place of the conventional shift rails and forks for shifting the parts 39 and 47 there are employed two rockshafts 57 and 59 journaled in bosses 60 and 62 in the side wall of the housing as best shown in Figure 14. Externally of the housing, these shafts have lever arms 61 and 63. Within the housing shaft 57 has secured thereto a lever arm 65 equipped with a bronze shoe 67, which latter is slotted to embrace the periphery of the disc portion of sliding member 39. The shoe 67 is pivotally mounted on the lever arm so that it may align itself with the disc part 39 as the shaft 57 is rotated. Similarly, shaft 59 is provided with an arm 69 carrying a pivoted shoe 71 associated with the collar 49 of gear 47.

An interlocking device between shafts 57 and 59 is shown by Figure 14. The hubs of arms 65 and 69 have cam surfaces 73 formed with notches 75. Within the notches are received detent balls 76. The balls are at the ends of a passage 80 and are held apart by a spring 77 located in the passage. A positive interlock is provided by the use of a solid rod 79 within the passage and surrounded by the spring.

It will be understood from Figure 13 that clockwise rotation of lever 61 from a neutral position effects a shift into second speed whereas a counter-clockwise rotation shifts to high speed. Similarly a clockwise rotation of lever arm 63 shifts into reverse and a counter-clockwise rotation shifts into low speed. When both arms are in neutral, the detent balls, spring and rod are as shown in Figure 14. When one or the other of levers is rocked to either one of its active positions, the cam on the hub of the lever pushes the adjacent ball into the passage 80 until it engages the end of the rod whereby the opposite end of the rod holds the other ball in the notch of the hub of the other lever to prevent possible movement of that other lever from its neutral position. The above described simple and direct acting expedient constitutes a very smoothly operating mechanism.

Returning to Figure 1, the lever 81 constitutes the means for rotating the lever arms 61 and 63 of the change speed mechanism. This lever 81 is supported by and near the top of the steering column 83 and is located behind the instrument panel. A combined bracket and housing 85 is carried by the steering column and extends radially therefrom. This bracket journals, preferably by needle bearings 87, a tubular shaft 89. To the upper end of the tubular shaft 89 is welded an arm 91. The arm is rotatable about a surface 93 at the bottom of the housing. Screws 95 secure a cover 97 to the housing. From the cover a pin 99, welded or otherwise secured thereto, extends into a bored-out opening 101 in the end of a shaft 103, which shaft extends axially through tubular shaft 89. The pin 99 affords an upper end bearing for the rotation of shaft 103. The lever 81 enters the housing 85. It is provided with an opening 105 whereby it embraces the shaft 103. The wall of the opening is arcuate as shown in Figure 4 to permit the rocking of the lever. Diametrically opposite faces of the lever are rounded to engage the arm 91 on one side and the arm 106 on the other side of the lever, the latter arm being preferably welded to shaft 103. By this means the lever 81 is free to rock in a substantially vertical plane. The arms 91 and 106 are formed with arcuate ends 107 provided with notches 109 as best shown by Figure 2.

The notches may register with each other and either one may be engaged by lug 111 on the end of lever 81. It will be evident that the knob end 113 of lever 81 may be depressed whereupon the lever will rock about its rounded surface contact with shaft 103 and with the arms 91 and 106, and thus the lug 111 will be brought into contact with the notch of the upper arm 106. A rotation of lever 81, provision for such rotation being made by a slotted opening 115 in the wall of the housing, will thereupon rotate shaft 103 about its axis.

After lever 81 is returned to its neutral position, it may be oppositely rocked to engage the notched end of arm 91 carried by the tubular shaft 89. The lever may then be rotated as before to rotate the hollow shaft 89 about its axis. Detent balls 117 carried in openings in arms 91 and 105 lock the one or the other of the arms to the housing 85 or to its cover 97 when the lever is rocked with the result that the rotation of the lever insures the rotation of one only of the nested shafts 89 and 103.

At the lower end of the steering column is a bracket 119 having spaced needle bearings 121 for the rotary support of the tubular shaft 89 and the solid shaft 103. Between the needle bearings, the bracket is recessed and in the recess a lever arm 123 is secured to the extreme end of the tubular shaft. The extreme end of shaft 103 beyond the lower needle bearing, has an arm 125. Links 127 and 129 connect these arms 123 and 125 with the arms 63 and 61. Anti-friction joints of any preferred form may be used to connect the links and the lever arms, such joints as shown in Figure 5 and designated by numeral 131.

It will be seen that a depression of the knob end of the shift lever 81 engages the lever with the shaft 103 and that rotation of the lever is then available to make shifts into second speed and high speed. If the knob end of lever 81 be lifted, the lever engages with the tubular shaft 89, rotation of which is available to make shifts into low speed and into reverse.

Figures 7 and 8 show a modification of the parts at the upper end of the steering column. In this form of the invention the steering post 201 is within a steering column 203 and extends above the upper end thereof. At the upper end of the column is a housing 205 having a tubular extension 207 extending downwardly into the steering column. A cover 209 is threaded to the housing and held from rotation by screws 211. The housing is formed at 213 as a journal for a hollow shaft 215. Rigid with or secured to the top of the shaft is a head 217 having a notch 219. A solid co-axial shaft 221 extends through tubular shaft 215. It rotates about an end bearing pin 223 secured as shown to the cover. This shaft is provided with a head 225 corresponding to but overlying head 217. A hand lever 227 is provided with a large opening 229 surrounding the steering post or shaft 201. The lever terminates with opposed lugs 231 adapted to engage the notches in one or the other of the two heads 217 and 225. To facilitate the movement of the lever for engagement with one or the other of the heads it is provided with a roller 233 mounted on a pin 235. The roller has a rounded surface 237 to accommodate the tilting movements and it travels on surfaces provided therefor in the housing and cover when being rotated to rotate the one or the other of the nested shafts. It will be readily seen that the lever may be tilted up or down as in the form first described and for the same purpose. When so tilted its end lugs engage the recesses in one or the other of the heads 217 and 225 whereby rotation of the lever may rotate the one or the other of the nested gear shifting shafts. In this form of the invention the cover has a tubular upper end 239 constituting the upper end of the steering column. At the lower end of the steering column the shafts 215 and 221 are suitably journaled and provided with lever arms as before and operate the same rockshaft arms 61 and 63 by means of connecting links.

Figures 9 and 10 illustrate a third form which the operating parts at the top of the steering column may assume. In this form of the invention a housing 301 embraces the top of the steering column 303 which in this case houses both the steering post 305 and the nested co-axial gear shifting shafts 307 and 309. Shaft 309 is journaled at 311 in the housing and the upper end of hollow shaft 309 itself journals the solid shaft 307. Shaft 307 has an arm 313 secured thereto, is slotted to surround the steering post 305 and has a notch 315 on that side of the steering post remote from the nested shafts. Hollow shaft 309 has a similarly shaped lever arm 317 with a notch 319 adapted to register with the notch 315. Hand lever 321 extends into the housing through an opening 323. It has a large opening at 325 to surround and avoid contact with steering post 305. It pivots about shaft 307 and has rounded surfaces at 310 and 312, the latter engaging the hubs of the arms 313 and 317. Vertical tilting of lever 321 permits its engagement with either arm 313 or 317 whereupon rotation of the lever rotates the selected axially extending gear shifting shaft.

Figures 11 and 12 show still another form and one which is now believed to be a preferred embodiment of the invention. In this form the steering post 401 is seen within the steering column 403. At the top of the steering column are seen the steering wheel spokes 405 and the hub 407. A bracket 409 is secured to the top of the steering column. Co-axially nested gear shifting shafts 411 and 413 extend through the bracket and their upper ends enter a housing 417 upon the top of the bracket 409, the housing being secured to the bracket by fastening means 415. Welded to the hollow shaft 413 is the sleeve part 419 of a head 421 having an upstanding lug 423. The sleeve 419 serves to journal the shaft 413 within the bracket. A bearing sleeve 425 within the hollow shaft 413 journals the solid shaft 411. At the top of shaft 411 there is secured a head 427 having a downwardly directed lug 429. In neutral positions the lugs 423 and 429 are directly opposite each other. A hand lever 431 extends through an opening 433 into the housing 417. An annular bushing 435 may be assembled on the lever to silence its contact on the ends of the slotted opening. The end of the lever within the slotted opening is arcuate in form and to the ends of the arc screws 437 secure the ends of an arcuate lever extension 439. The arcuate parts of the lever and the extension produces an enlarged opening surrounding the steering post 401 and prevent contact therewith as the lever is rotated. The lever extension is provided with an opening engaging a spherical surfaced part 440 of the solid shaft 411 whereby the lever 431 may be rocked or tilted. The end of the lever extension 439 in the vicinity of the opposed lugs 423 and 429 is recessed or notched to engage the one or the other of the lugs when tilted. If desired, a rubber bumper 441 may be mounted on the lower extension to prevent noise when shifting into engagement with the head of the high speed shifting shaft 411. Also to prevent rattling and to bias the hand lever into engagement with the high and second speed shaft, there may be employed a spring 443. One end of this spring is looped about the recessed upper end of shaft 411. The spring extends from this shaft in the form of an arc and its other end is anchored under the head of screw 437.

I claim:

1. In a motor vehicle, a steering column, a steering post therein, inner and outer nested shafts extending along the side of said column and supported thereby for rotation, said nested shafts having lever arms with opposed lugs, a lever mounted to rock on a rounded part of the inner of said nested shafts, said lever having opposite slots to engage the one or the other of said lugs whereby subsequent rotation of said lever may rotate one of said nested shafts, a ratio changing transmission having reciprocable shifting members and connecting means between and connected to said nested shafts and said reciprocable members.

2. The invention defined by claim 1, said lever formed with an enlarged opening surrounding the steering post.

3. The invention defined by claim 1, together with a spring to bias said lever into engagement with a selected one of said nested shafts.

4. The invention defined by claim 1, together with a cushioning means carried by said lever to engage one of said lever arms.

5. The invention defined by claim 1, together with housing means at the upper end of the steering column to receive the work end of the lever and to enclose the ends of said nested shafts, said housing having a slotted opening to permit the rotation of the lever.

6. The invention defined by claim 1, together with housing means at the upper end of the steering column to receive the work end of the lever and to enclose the ends of said nested shafts, said housing having a slotted opening to permit the rotation of the lever, said lever carrying cushioning means to engage the ends of the slot.

7. In a motor vehicle, a steering column, a steering post therein, a change speed mechanism having reciprocable members, a pair of nested shafts mounted by and positioned alongside said steering column, means connecting the ends of said nested shafts with said reciprocable members, a combined bracket and housing carried by the upper end of said column, the upper ends of said nested shafts extending into said housing, the outer of said nested shafts journaled in said bracket, the inner of said nested shafts journaled in the outer of said shafts, said nested shafts having lever arms within said housing, said housing being provided with a slot, a manually operable lever entering said slot and surrounding said post, said manually operable lever and the inner of the nested shafts having cooperating surfaces to permit rocking of said lever, said manually operable lever and the lever arms of the nested shafts having inter-engaging parts whereby the manually operable lever, after being rocked, may be rotated to thereby rotate one of the nested shafts.

8. The invention defined by claim 7, together with means to rotatably support the nested shafts adjacent the lower ends of the steering column.

9. In a motor vehicle, a hollow steering column, a steering post therein, a change speed mechanism having reciprocable members, a pair of nested shafts supported for axial rotation alongside said steering post and within said steering column, means connecting one pair of ends of said nested shafts with said reciprocable members, a housing carried by the upper end of said steering column, said nested shafts extending into said housing, a lever extending into said housing and surrounding said post, said lever being journaled for rocking motion, said lever and nested shafts having interlocking parts whereby the lever may be rotated to rotate a selected one of said nested shafts.

10. The invention defined by claim 9, said interlocking parts of the nested shafts comprising lever arms straddling the post and having recesses on the sides of the arms remote from the nested shafts adapted to be engaged by the lever when rocked.

ERNEST W. SEAHOLM.